United States Patent

[11] 3,585,309

[72] Inventor Klaus Gueldenpfennig
Monroe, N.Y.
[21] Appl. No. 782,078
[22] Filed Dec. 9, 1968
[45] Patented June 15, 1971
[73] Assignee Stromberg-Carlson Corporation

[54] CROSSPOINT NETWORK PATH FINDING SYSTEM
7 Claims, 3 Drawing Figs.

[52] U.S. Cl. .......... 179/18, 179/22
[51] Int. Cl. .......... H04q 3/56
[50] Field of Search .......... 179/18.7, 27.01, 22, 18, 18.21

[56] References Cited
UNITED STATES PATENTS
3,235,668 2/1966 Abbott .......... 179/18 (.7Y)
2,949,506 8/1960 Abbott et al. .......... 179/22

*Primary Examiner*—Kathleen H. Claffy
*Assistant Examiner*—Thomas W. Brown
*Attorney*—Charles C. Krawczyk

ABSTRACT: A path finding system for a telephone switching system having a plurality of reed relay matrix stages is described. Different groups of junctors are connected to different matrices of the stage at one end of the system, while different matrices of the stage at the opposite end of the system are connected to line circuits. Links are established through the stage at the junctor end of the system by connecting a free junctor to its associated matrix and then scanning the matrix associated with the free junctor to rapidly select a free link therein. Connections are then automatically extended through the remaining stages to the line circuit of the subscriber with respect to which communication services are desired.

PATENTED JUN 15 1971 3,585,309

INVENTOR.
KLAUS GUELDENPFENNIG

BY

ATTORNEY

INVENTOR.
KLAUS GUELDENPFENNIG

BY

ATTORNEY

INVENTOR.
KLAUS GUELDENPFENNIG
BY
ATTORNEY

CROSSPOINT NETWORK PATH FINDING SYSTEM

The present invention relates to telephone switching systems and particularly to an improved system for selecting free links in a multistage matrix switching network.

The invention is especially suitable for use in a semiautomatic switching system, such as may be exemplified by the Bell Telephone 304 system wherein a large number of calls may be set up with minimal operator assistance. The invention, however, is suitable for use in automatically providing connections between lines both rapidly and efficiently without redundant or duplicate connections in any application where signalling or other communication services are desired.

Many types of matrix switching networks have been suggested for providing connections between selected inlets and outlets. However, in order to provide rapid switching action in establishing the path, a large multiplicity of alternate routes are generally required. Each of these routes requires several cross-points (viz a relay or relays and several contacts). Compromises between switching speed and hardware complexity therefore have been required. It is a feature of this invention to provide rapid switching with a minimum of hardware. For example, existing switching systems generally require several guard relays for each possible path. When a path is established, the guard relays associated therewith operate and prevent duplicate use of that path. It is a feature of this invention to eliminate a large number of such guard relays.

In order to increase switching speed, it is necessary to mark a connected link as bush in order to prevent loss of time in attempting pathfinding through links which are not available for use. In order to achieve this objective, many switching systems have provided separate means which have increased the complexity and cost of the system. It is a feature of this invention to effect both functions of selecting available links and marking such links as busy with essentially the same hardware, thus decreasing the cost and increasing the reliability of the switching system.

In order to accommodate various marking and selecting functions, it has often been necessary to provide separate sources of power, such as DC busses, in the switching system. Inasmuch as bus wiring and its ancillary fusing requires space which otherwise could be allotted to additional links, it has been difficult to miniaturize the switching system to the extent desired. For example, it is desirable to accommodate the switching system in a few cabinets. It is a feature of this invention to provide a switching system which does not require power within the switching matrix stages.

Accordingly, it is an object of the present invention to provide an improved automatic switching system.

It is a further object of the present invention to provide an improved automatic switching system which uses relay cross-point matrices.

It is a further object of the present invention to provide an improved electronic control system for rapidly establishing connections through a switching network.

It is a further object of the invention to provide an improved electronic control system for a plural stage switching network made up of individual switching matrices in each stage.

It is a still further object of the present invention to provide an improved automatic switching system which provides rapid path selection while, at the same time, insures against duplicate selection of the same path and yet eliminates many components, such as guard relays, which have previously been required in such systems.

It is a further object of the present invention to provide an improved electronic switching system which is operative to select links and mark them busy without separate devices for accomplishing each of these functions.

It is another object of the present invention to provide an improved electronic switching system operative at high speed to select free links by automatically being conditioned to avoid busy links.

It is a still further object of the present invention to provide an improved switching machine utilizing cross-point matrices wherein the need for power and buss wiring within the matrix is eliminated.

It is still another object of the present invention to provide an improved electronic switching system utilizing reed relay matrices which may be made relatively small in size through the elimination of wiring fusing, and relays which have previously been required.

It is still another object of the present invention to provide an improved electronic switching system which may be manufactured at low cost without sacrificing reliability.

Briefly described, an automatic switching system embodying the invention includes a plurality of switching stages arranged between opposite ends (say inlets and outlets) of the system. Each stage has a plurality of switching links. A link scanner is provided for selecting a free link in the stage which is located at one end of the system, say at the outlets. Connections are then provided to the selected link through other links in the other stages so that a switching path is provided from a selected inlet to a selected outlet which is extended through the selected free link in the stage at the outlet end of the system and thence through the remaining stages to the selected inlet.

The invention itself, both as to its organization and method of operation, as well as additional objects and advantages thereof will become more readily apparent from a reading of the following description in connection with the accompanying drawings in which.

Figure 1:
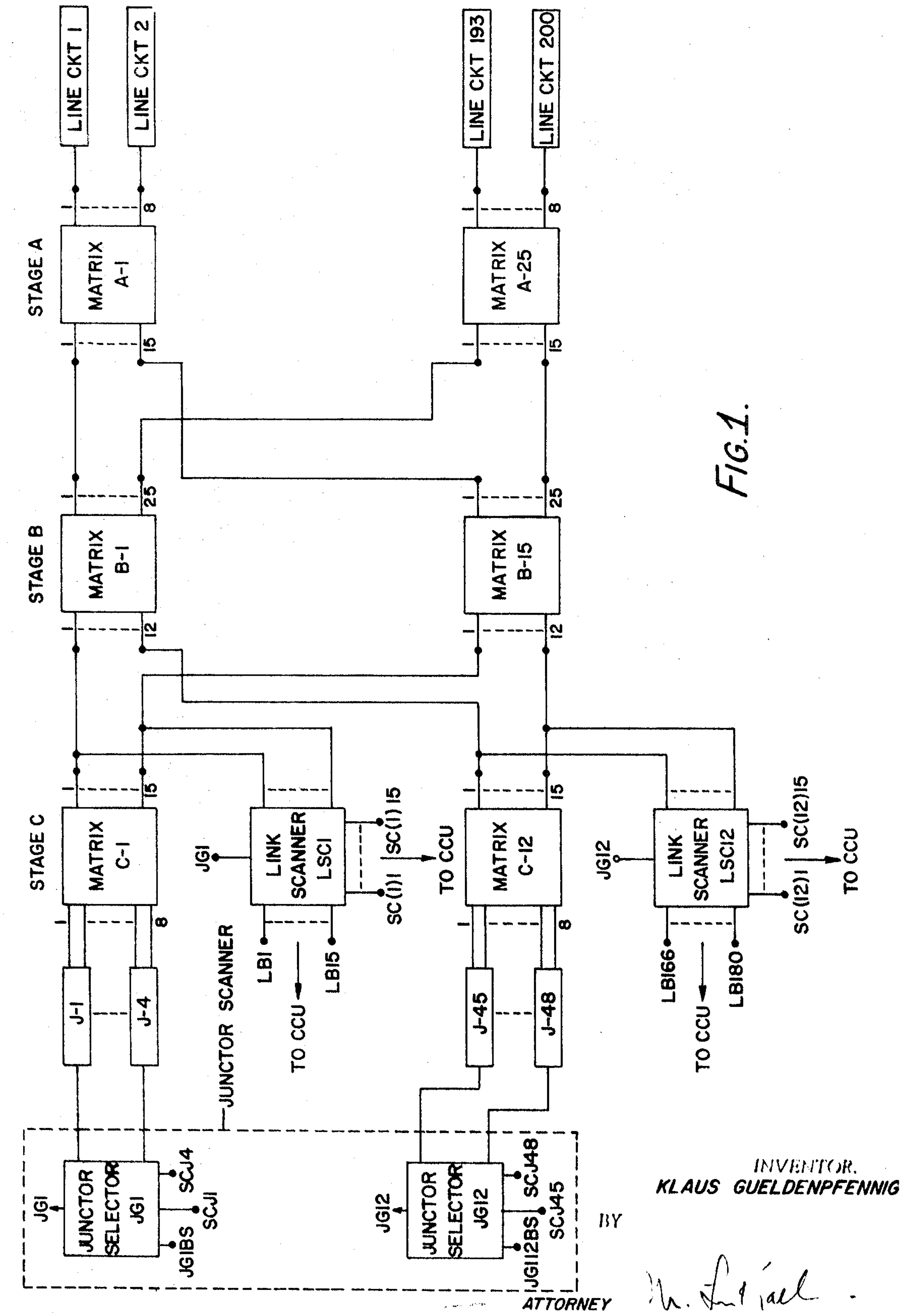
FIG. 1 is a simplified block diagram of an automatic switching system embodying the invention.

Referring more particularly to FIG. 1, the basis of the switching system is a plural stage full availability switching matrix having three stages, A, B and C. Each stage contains a plurality of matrix stages which are interconnected so as to provide, in the system depicted herein for purposes of illustration, 200 possible connections between line circuits at the inlet end of the matrix and 48 junctors having 96 ports at the outlet end thereof. Inasmuch as a 200 line system is depicted herein, the first stage A is provided with 25 matrices A1 through A25. The second stage B has 15 matrices B1 through B15, while the last or secondary stage C has 12 matrices C1 through C12. The matrices are interconnected such that any one inlet thereto can find a link to any of its outlets. In matrix A1, for example, there are 8 inlets which can be connected selectively to any of 15 outlets.

Line circuits are connected to the stage A matrices in groups, 8 line circuits constituting a group. Thus, line circuits 1 through 8 are respectively connected to inlets 1 through 8 through matrix A1. The final group of 8 line circuits 193 to 200 are respectively connected to inlets 1 through 8 of matrix A25. The intermediate matrices and their associated line circuits have not been shown in order to simplify the illustration.

Outlets 1 through 15 of matrix A1 are connected to inlet 1 of matrices B1 through B15, respectively and the outlets of succeeding matrices are connected to correspondingly numbered inlets of the matrices B1 through B15. The outlets of the matrices in stage B are similarly connected to the inlets of the matrices in Stage C. For further information respecting the interconnection of matrices in the manner described above, reference may be had to an article entitled "A Study of Non Blocking Switching Networks" by C. Close which appeared in the "Bell System Technical Journal," Mar. 1953, pages 406—424.

The inlets of the stage C matrices are connected to the junctors served by junctor selectors. Four junctors, each having a calling (ing) and called (ed) lines are associated as a junctor group with each of the matrices C1 through C12. Junctors J1 through J4 which constitute the first junctor group JG1 are associated with matrix C1. The remaining junctor groups JG1 are similarly connected by junctor selectors for their respective groups to matrices C2 through C12. Thus, junctors J45 through J48 are connected by the junctor selectors for JG12 to matrix C12.

The junctor selectors receive scanning inputs from the central control unit (CCU) which is associated with the switching system. This control unit may include a nonhoming marking system which is similar to the link scanners associated with stage C, to be discussed hereinafter. Briefly, each junctor includes digital logic, such as a flip-flop, which is conditioned to store information as to whether or not a junctor is in use, thereby marking that junctor as busy and precluding the establishment of a connection between that junctor and its associated matrix. Upon occurrence of the first scanning pulse associated with a free junctor, connections are made through the free junctor selector which permits a connection of that free junctor to its associated scanning matrix. When all of the junctors in a group are busy, a junctor group busy level is provided (e.g. JG1BS for the free junctor selector JG1) which precludes selection of the junctor group.

Link scanners LSC1 through LSC12 are associated respectively with matrices C1 through C12. When a free junctor is selected the common control unit provides a signal level on a terminal for the link scanner connected to the matrix group which is associated with the selected junctor group (e.g. if one of the junctors J1 through J4 in the junctor group JG1 is selected, a signal level is provided on terminal JG1 of link scanner LSC1). The common control generates scanning pulses at relatively high speed (say 480 kHz). When a link is to be selected one of these pulses appears on the scanning terminals of the link scanner allocated thereto (viz SC(1)1 through SC(1)15 for the link scanner LSC1 through SC(12)1 to SC(12)15 for the link scanner LSC12). Each scanning pulse is associated with a different link in its respective matrix (e.g. SC(1)1 is associated with the first link or link 1 out of the 15 links available in matrix C1). Any links that are used or busy are marked by an appropriate link busy signal LB1 through LB180 which are applied to the link scanners. Thus, the first free link which is encountered is utilized and a connection is extended therethrough to the selected junctor. This connection is then extended through a free link in stage B. A line circuit to which service is desired is marked and the connection is then extended through the matrix of stage A which is connected to the marked line circuit. Thus, for example, for each line circuit which is marked, a link is extended to one of the 15 available links in matrix A1 to line circuit 1 and thence through any of the 375 links available in stage B to the selected link in stage C1.

Ringing or busy signals to a subscriber connected to a line circuit are provided via the subscriber line connected between the subscriber station and the line circuit. The audio or voice path is provided through cross-point contacts of the relays which establish the switching path, such that the talking path corresponds to the switching path. The talking path may be two or four wire as desired.

Figure 2:
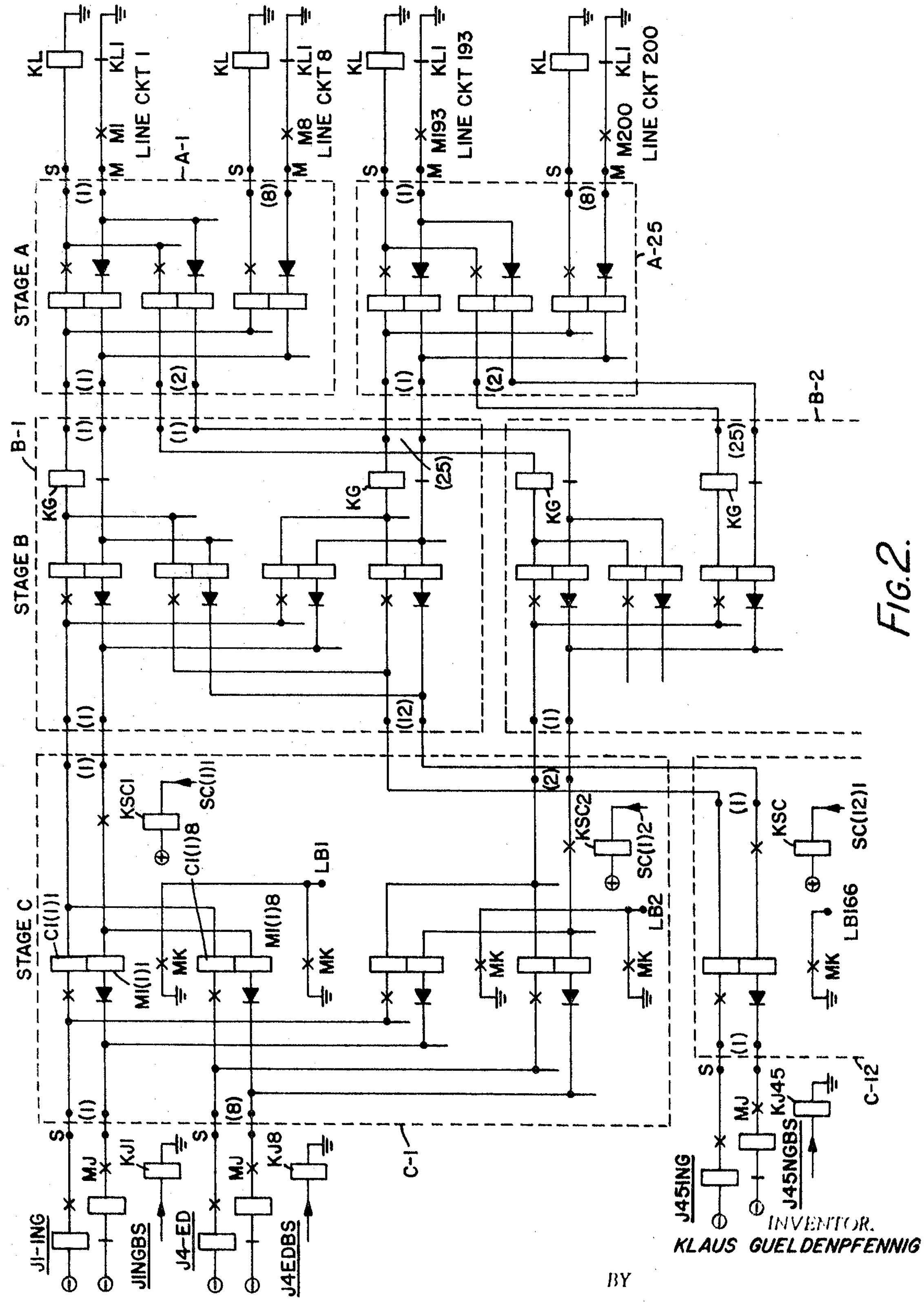
FIG. 2 is a more detailed block diagram of portions of the system shown in FIG. 1, especially switching matrix stages thereof.

Referring to FIG. 2, exemplary reed relay cross-point switches contained in matrices A1 and A25 of stage A; B1 and B2 of stage B and C1 and C12 of stage C are shown for purposes of a more detailed presentation of the embodiment of the invention shown in FIG. 1. The control relays of line circuits 1, 8, 193 and 200, as well as the free junctor selectors associated with the calling line of junctor J1; the called line of junctor J8 and the calling line of junctor J45 are also depicted.

A mark and sleeve lead is provided for each link. Both mark and sleeve are arranged in a series circuit from a source of voltage at the junctors to ground in the line circuits. Thus, no power, and therefore no buss wiring or fusing are necessary in the matrices. Each line in use is fused in its associated junctor and does not carry any current or have any voltage applied thereto when not in use. Sleeve circuits for holding and link marking are not required. The junctors are used to provide information storage for the status of a call.

Each link in each matrix includes a mark relay in the mark side and a control relay in the sleeve side. These relays are wound on the same bobbin in order to reduce the amount of current necessary to pull in the sleeve relays. The relays are multiplied, each link in each stage having as many relays as the number of inlets thereto. Thus, in matrix A1, 15 relays are provided for each of the 15 possible links between each line circuit and the 15 outlets. In matrix C1, there are 8 relays for each link. The control relay C1(1)1 and mark relay M1(1)1, which is the first relay associated with link 1, is illustrated as is the control relay C1(1)8 and M1(1)8 of the eighth relay associated with link 1. Diodes which are provided across each relay coil to short circuit inductive kickback are not shown in the drawing to simplify the illustration. A diode is also connected in series with each mark relay for decoupling purposes. Note that decoupling diodes are not used on the sleeve lead and are made unnecessary by virtue of the series connection of links and because the sleeve relays pull in only after their associated mark relays have done so.

The line circuits include a relay KL in the sleeve side which operates a break contact KL1 in the mark side when it is energized. A make contact ML through M200 are provided in the mark sides of the line circuits 1 through 200 respectively. These contacts may be closed by the operator or by a subscriber going off-hook in the case of a calling subscriber. When a subscriber is called, the operator selects the called subscriber by closing the contact M8. Ringing current will then be connected to the subscriber line. In the event that the common control unit has equipment for automatically connecting the called line, it will effect closure of the contact M1 through M200 associated with the called subscriber. A guard relay KG is provided for each link in each matrix of stage B. It has a break contact in the side of each link and pulls in when holding current flows through the sleeve side.

The mark relays in each of the matrices have a make contact in series with their associated control relays and in series therewith in the sleeve side of the circuit. Accordingly, when the mark relays pull in, a connection is made to their associated control relays.

The mark relays in the Stage C also have an additional marking contact MK associated therewith. This mark contact is a make contact which closes when its associated mark relay is energized and extends ground to a link bush LB terminal associated with the link to which its mark relay is connected. Thus, for example, if mark relay M1(1)1 is energized, or if any of the other mark relays, such as M1(1)8, associated with link 1 of matrix C1 is energized, ground is connected at the line busy terminal LB1.

Each link in stage C also has a scanning relay KSC associated therewith. This relay includes a mark contact in the sleeve side of the link. The scanning terminals are connected to the operating windings of these relays KSC, and when the control level (ground in the illustrated case) is connected thereto, the relay operates closing the make side of the link associated therewith. The link scanner LSC1 is connected to the terminals SC(1)1 through SC(1)15 of the matrix C1 and energizes the relay KSC1 associated with link 1 when that link appears to be selected.

The junctor includes control relays KJ1 through KJ8 in the case of junctors J1 through J4 associated with matrix C1; other relays KJ being provided for each of the calling and called lines of the other junctors. A marking make contact MJ is closed when the relay KJ associated therewith pulls in. The control level J1NGBS through J4EDBS in the case of the junctors of group JG1 are maintained during the pendency of a call and may be used in the common control to indicate that the junctor is busy. Logic (not shown) connected to these leads provides the level JG1BS from the junctor group JG1 (FIG. 1) in the case where all of the junctors J1 through J4 of JG1 are in use. The mark side of each junctor selector circuit includes a relay having a slow to operate make contact in the sleeve circuit associated therewith. The sleeve circuit for each junctor also includes a relay having a break contact in the mark side for disconnecting the mark circuit of the junctor once a holding connection is established in the junctor sleeve.

Figure 3:
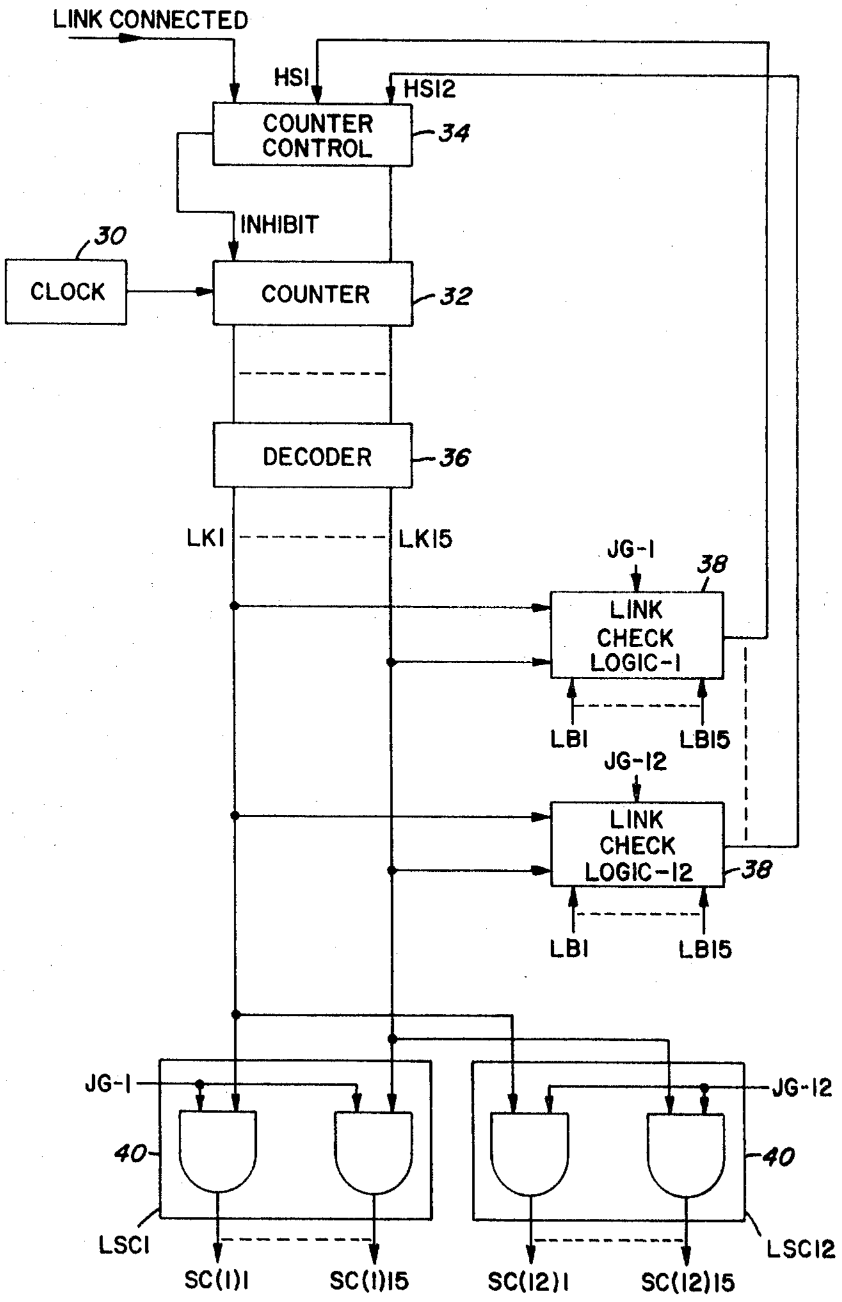
FIG. 3 is a simplified block diagram of the link scanners shown in FIG. 1.

Before considering the operation of the switching system shown in FIG. 2, reference should be had to FIG. 3 which illustrates the link scanners common circuitry, as well as the circuitry individual to the link scanners LSC1 through LSC12 for each matrix C1 to C12. The common circuitry includes a source of high frequency clock pulses 30, 480 kHz. being suitable. These pulses are applied to a multistage binary counter 32 which may be constituted of a plurality of JK flip-flop stages. A level on an inhibit line is applied from counter control logic 34 to inputs of the JK flip-flop stages in order to stop the count. The count will be stopped for a predetermined period of time. To this end, the counter control logic 34 may include a one-shot multivibrator which is triggered upon application of a hold scan pulse indicated as HS1 through HS12 on any of a plurality of hold scan lines, and provides the inhibit level to the counter 32. In the event that a "link connected" control level is not applied to the counter control logic 34, the inhibit level will be present for a period, say 30 milliseconds, sufficient for the control and marking relays in the matrices of the switching system to operate. The Link Connected level is obtained from the common control in response to operation of a relay in the sleeve side of a junctor OR-gated from all the junctors. A link is taken as being connected upon operation of a junctor sleeve relay, whereupon the counter control inhibit level is removed and the counter operation may continue.

The common circuitry also includes a decoder 36 which translates the numbers stored in the counter 32 into an output pulse on one of 15 lines, each associated with a different one of the 15 links which may be provided in the matrices C1 through C12 of stage C. These outputs are indicated as LK1 through LK15. Individual to each link scanner is a separate link check logic circuit 38 and a relay drive circuit 40. Each link check logic circuits receive as inputs thereto the pulses LK1 through LK15 and one of the levels JG1 through JG12.

The level JG1 is obtained, for example, by logic circuits (not shown) in response to selection of any junctor in the group JG1. For example, the level JG1 may be provided by an OR gate connected to the J1NGBS through J4EDBS lines connected to the KJ relays which mark a selected junctor in junctor group JG1. Note that since only one junctor is selected at any one time, only one JG level will be produced at any one time.

Each link check logic also receives inputs from the link busy LB terminals for each link in the stage C matrix with which it is associated. Ground levels will appear on all LB terminals for the links which are marked busy.

Each Link Check Logic includes a multiplicity of AND gates associated with inverters. In the case of Link Check Logic—1 (which is associated with matrix C—1), a gate is provided for each LK input. The LB1 inputs are connected (through inverters if necessary) to different ones of the gates. The JG1 input is common to all of the gates. The outputs of all of the gates are combined in an OR circuit to product a hold scan pulse corresponding to the first LK pulse associated with a free link as indicated by the absence of an LB ground level. The hold scan output from Link Check Logic—1 is indicated as HS1. This HS1 output will be coincident with the first free link and the LK pulse corresponding thereto.

Upon receipt of a hold scan pulse, the counter control 34 operates to produce an inhibit level stopping the counter 32. The LK pulse then persists as a level and is gated out through its associated AND gate in the relay driver circuits 40 to extend ground to one of the terminals SC(1)1 through SC(1)15 depending upon which link is selected. Although pulses continuously appear on the LK lines, before occurrence of a hold scan pulse, these pulses will be of insufficient duration to operate the KSC relays. Also, only the gates 40 of the link scanner associated with the selected junctor group will be enabled by virtue of the application of the JG level for that junctor group thereto.

Selection of a link is extremely rapid and is dictated principally by the repetition rate of the clock 30. The counter steps along at the high counting rate until a link in the junctor group is selected. Thereupon, a hold scan pulse is not produced until a free link is selected. In the event that a link is not selected within the 30 millisecond duration of the inhibit level, the counter is permitted to continue on until it reaches a count corresponding to the next free link in the matrix. As mentioned previously, the junctor may be selected by a non-homing allotter which stops at the first free junctor (viz a junctor group having less than 4 busy junctors).

Consider now the operation of the switches system when a subscriber associated with a selected line circuit is a calling party. The allotter in the free junctor selectors will select the first junctor in the first junctor group which is not busy. Consider that junctor J1ING is selected. A J1INGBS level operates relay KJ1 and marking contact MJ of relay KJ1 closes. A JG1 enabling level is applied to the link scanner LSC1.

Assume that the first LK pulse to occur is LK1. An HS1 pulse is produced by link check logic 1 so as to operate the counter control logic which produces an inhibit level to stop the counter 32 (FIG. 2). The LK1 pulse (now a level) enables the AND gate on the left hand side of the drivers 40 so as to extend ground to terminal SC(1)1. Relay KSC for the first link pulls in. Relay M1(1)1 also pulls in since contact MJ is closed in the mark side of J1ING. A series circuit is completed between the mark side of line 1 at outlet (1) of matrix C—1 and a source of negative potential at the junctor J1ING. This potential is now applied to the inlet (1) on the mark side of stage B. The only path from the mark side of stage B to line circuit 1 is through link (1) of matrix B1 and link (1) of matrix A1. Since these links are not busy, the mark relays therein pull in closing the contacts associated therewith on the sleeve sides of the circuit.

Note that the relay in the mark side of junctor J1ING is slow to operate. Accordingly, no current flows through the sleeve side contacts while they close. Such "dry" closure of reed relays extends their life. Immediately after the contacts of the mark relays in the matrices close, the sleeve side contact of the relay in the mark side of the junctor closes, thereby permitting current to flow through the sleeve side of the selected links. The control relay in the sleeve side of the junctor J1ING breaks the connection to the voltage source on the mark side. The guard relay KG for link 1 also opens the mark side of link 1 of stage B. The relay KL in the line circuit opens contact KL1 associated therewith. Thus when the sleeve side of the selected link is energized, the mark side of the link is completely disconnected at the junctor circuit, line circuit and Stage B matrix. The control relays in the links remain connected until the call is terminated, either by the operator or by one of the interconnected parties going on-hook. To this end, another contact may be provided in the sleeve of the line circuit which can be disconnected either by the subscriber going on-hook or by the operator.

A called party is selected when the operator is already connected to a calling party through a junctor. The junctor group level JG associated with the called side of the selected junctor is provided to the link scanner to allow scanning of the 15 links in the C-matrix connected to the called junctor. Another free link in the one of the C stage matrices associated with the called junctor is selected as described above. The called line circuit is marked by the M contacts of the called line circuit and connection is extended to the selected C stage link via a stage B link and a link in a stage A matrix which is connected to the called line circuit.

After the matrix circuit is completed in the selected A, B and C stage links, the sleeve circuit associated therewith pulls in, thereby releasing the mark circuit as previously described.

In the event that link 1 of matrix B1 is busy, it becomes necessary to select another link in matrix C1. The next link may, for example, be link 2. This link is associated with matrix B2. Accordingly, link 1 of matrix B2 and inlet 2 of matrix A2 may be used to extend the connection to line circuit 1. The scanner will therefore search until a free link is available which will find a path from the selected junctor to the marked line circuit.

From the foregoing description, it will be apparent that there has been described an improved automatic switching system having an electronic control system for rapidly selecting a free path through the switching network. The system affords economy in hardware and increased reliability by the reduction of the number of components necessary to select free paths. Variations and modifications in the herein described system within the scope of the invention will undoubtedly suggest themselves to those skilled in the art. Thus the foregoing description should be taken as illustrative and not in any limiting sense.

What I claim is:

1. A path finding system for effecting selection and interconnection of devices through a switching network, wherein said network includes a plurality of switching matrix stages interconnected to provide plural paths between devices connected to opposite ends of said network, and wherein each stage is divided into separate matrix groups, said path finding system comprising:
- means for selectively marking devices connected to matrix groups in the stages on opposite ends of the network;
- switching means in the plurality of matrix groups in a stage at one end of the network for providing signals designating the busy-free condition of individual interconnections between these matrix groups and the matrix groups of an adjacent stage;
- means for sequentially detecting the busy-free condition of the individual interconnections between a matrix group in said end stage connected to a marked device and the matrix groups of the adjacent stage, and
- circuit means responsive to a detected free condition in one of said interconnections for enabling the interconnection to complete a path through said network between marked devices connected to opposite ends of said network.

2. A path finding system as defined in claim 1 wherein:
- said circuit means responsive to a detected free condition includes switch means connected in series with individual ones of said interconnections, means for sequentially applying enabling signals, synchronized to said detecting means, to the switch means connected in series with the interconnections to the matrix group connected to a marked device at a rate wherein the switch means do not respond to said signal, and means for stopping said means for applying the enabling signals when a free path is detected for applying an enabling signal for a sufficient period of time to complete a path between marked devices on opposite ends of said network.

3. A path finding system for effecting selection and interconnection of devices through a switching network, wherein said network includes a plurality of switching matrix stages interconnected to provide plural control paths and corresponding plural switch paths between devices connected to opposite ends of said network, wherein each stage is divided into a plurality of separate matrix groups, and wherein each matrix group includes a plurality of cross-point switching devices arranged to form a matrix switch with the cross-point devices connected in said control paths and their switches connected in said switch paths, said path finding system comprising:
- means for selectively marking the control path connections of the devices at opposite ends of the network;
- switching means in the plurality of matrix groups in a stage at one end of the network for providing signals designating the busy-free condition of control path interconnections between the matrix groups and the matrix groups in an adjacent stage;
- scanning means for sequentially enabling individual control path interconnections between a matrix group of said end stage that is connected to a marked device and the matrix groups of an adjacent stage, wherein said control path interconnections are enabled for a time duration that is insufficient to switch the cross-point devices, and
- means for detecting a signal indicating a free control path interconnection has been enabled, and for stopping said scanning means so that said scanning means applies a signal of sufficient duration to switch connected cross-point devices to complete a control path and a corresponding switch path through the network between marked devices.

4. A path finding system as defined in claim 3 including:
- means for detecting the completion of a connection through the network, and
- means for restarting said scanning means if a connection through said network is not completed within a preset period of time after said scanning means is stopped.

5. A path finding system as defined in claim 4 wherein said scanning means includes:
- separate enabling circuits for each of said control path interconnections in each of said matrix groups in said end stage, and wherein the enabling circuits are connected in series with their respective control path interconnections;
- a source of sequential scanning signals having time durations insufficient to switch said enabling circuits, and
- control means including a switching circuit for completing the connections between said source and said enabling circuits for sequentially applying the scanning signals to the enabling circuits of a matrix group connected to a marked device.

6. A path finding system for effecting selection and interconnection of telephone circuits through a switching network wherein said network includes a plurality of switching matrix stages, wherein each stage is divided into separate matrix groups, wherein each matrix group includes a plurality of cross-point devices arranged to form a matrix switch, and wherein the cross-point devices in the matrix groups are interconnected between matrix groups of adjacent stages by control leads for controlling the actuation of said cross-point devices to provide plural paths between telephone circuits connected to opposite ends of said network, said path finding system comprising:
- means for selectively marking the control leads of telephone circuits connected to matrix groups in the stages on opposite ends of said network;
- switch means in the plurality of matrix groups in an end stage for providing signals designating the busy-free condition of the control lead interconnections between the matrix groups in said end stage and the matrix groups of an adjacent stage;
- scanning means for sequentially enabling the control lead interconnections between a matrix group in said end stage connected to one of said marked telephone circuits and the matrix groups of the adjacent stage, and wherein the time duration the control lead interconnections are enabled is insufficient to switch the cross-point devices;
- switching means connected in the control lead interconnections between the matrix groups in the other end stage and its adjacent stage for disabling the control lead interconnections therebetween corresponding to busy paths;
- means for detecting a signal indicating a free condition in control lead interconnection in the scanned matrix group and for stopping said scanning means so that the free control lead interconnection is enabled for a sufficient duration to switch cross-point devices in said plurality of stages to complete the control path between marked telephone circuits on opposite ends of said network;
- means for detecting the completion of a connection between marked telephone circuits at opposite ends of the network, and
- means for restarting the scanning means if a connection through said network between the marked telephone circuits is not completed within a preset period of time after said scanning means is stopped.

7. A path finding system as defined in claim 6 wherein:
- said cross-point device comprises relay switches having mark and sleeve relay coils, wherein the mark coils are interconnected by said control leads, wherein said sleeve coils are interconnected by sleeve leads and by contacts of their respective relay switches to form plural holding current paths, and wherein contacts of said relay switches are interconnected to form plural signal paths, and said switch means comprises a separate contact from each of said relay switches in each of said scanned matrix groups in said end stage wherein the contacts are interconnected in said matrix groups to provide a separate busy-free signal for each of the control lead interconnections to said scanned matrix groups and so that when one of the relays connected to a control lead interconnection is activated the contacts of the activated relay provide a busy signal for that control lead interconnection.